United States Patent [19]

Curtis

[11] Patent Number: 6,023,764
[45] Date of Patent: Feb. 8, 2000

[54] METHOD AND APPARATUS FOR PROVIDING SECURITY CERTIFICATE MANAGEMENT FOR JAVA APPLETS

[75] Inventor: Bryce Allen Curtis, Round Rock, Tex.

[73] Assignee: International Business Machines Corporation, Armonk, N.Y.

[21] Appl. No.: 08/954,654

[22] Filed: Oct. 20, 1997

[51] Int. Cl.[7] ................................................. G06F 12/14
[52] U.S. Cl. ............................................................. 713/200
[58] Field of Search ................................. 713/200, 201, 713/202; 709/224, 225, 229, 232; 380/3, 4, 23, 24, 49

[56] References Cited

U.S. PATENT DOCUMENTS 5,657,390   8/1997   Elgamal et al. .......................... 380/49
5,727,145   3/1998   Nessett et al. .......................... 713/200
5,745,678   4/1998   Herzberg et al. ....................... 713/200
5,870,544   2/1999   Curtis ..................................... 713/201

Primary Examiner—Robert W. Beausoliel, Jr.
Assistant Examiner—Pierre E. Elisca
Attorney, Agent, or Firm—Richard A. Henkler; Leslie A. Van Leeuwen

[57] ABSTRACT

The present invention defines a means for establishing a secure connection between a Java Applet and a secure web server for protocols other than Https via the use of a Java Security Service. More specifically, the present invention uses the web browser's installed certificates to setup and establish an encrypted session between the Java Applet and the secure web server. The secure connection is then used to retrieve the certificates required by the Java security service.

15 Claims, 4 Drawing Sheets

METHOD AND APPARATUS FOR PROVIDING SECURITY CERTIFICATE MANAGEMENT FOR JAVA APPLETS

CROSS-REFERENCE TO RELATED APPLICATION

The present patent application is related to Ser. No. 08/954,615, entitled "METHOD AND APPARATUS FOR CREATING A SECURE CONNECTION BETWEEN A JAVA APPLET AND A WEB SERVER" (Attorney Docket No. AT9-97-763), issued as U.S. Pat. No. 5,870,544 on Feb. 9, 1999.

BACKGROUND

1. Field of the Present Invention

The present invention generally relates to computer systems, and more particularly, to methods and apparatuses which create secure connections between Java Applets and web servers.

2. Description of the Related Art

The development of computerized distributed information resources, such as the "Internet", allows users to link with servers and networks, and thus retrieve vast amounts of electronic information that was previously unavailable using conventional electronic mediums. Such electronic information increasingly is displacing more conventional techniques of information transmission, such as newspapers, magazines, and even television.

The term "Internet" is an abbreviation for "Internetwork", and refers commonly to a collection of computer networks that use the TCP/IP suite of protocols. TCP/IP is an acronym for "Transport Control Protocol/Interface Program", a software protocol developed by the Department of Defense for communication between computers.

Electronic information transferred between computer networks (e.g., the Internet) can be presented to a user in hypertext, a metaphor for presenting information in a manner in which text, images, sounds, and actions become linked together in a complex non-sequential web of associations that permit the user to "browse" through related topics, regardless of the presented order of the topics. These links are often established by both the author of a hypertext document and by the user.

For example, traveling among hypertext links to the word "iron" in an article displayed within a graphical user interface might lead the user to the periodic table of the chemical elements (e.g., linked by the word "iron"), or to a reference to the use of iron in weapons in Europe in the Dark Ages. The term "hypertext" is used to describe documents, as presented by a computer, that express the non-lineal structure of ideas, as opposed to the linear format of books, film, and speech.

Hypertext, especially in an interactive format where choices are controlled by the user, is structured around the idea of offering a working and learning environment that parallels human thinking—that is, an environment that allows the user to make associations between topics, rather than moving sequentially from one topic to the next, as in an alphabetic list. In other words, hypertext topics are linked in a manner that allows users to jump from one subject to other related subjects during a search for information.

Networked systems using hypertext conventions typically follow a client/server architecture. A "client" is a member of a class or group that uses the services of another class or group to which it is not related. In the context of a computer network, such as the Internet, a client is a process (i.e., roughly a program or task) that requests a service which is provided by another program. The client process uses the requested service without having to "know" any working details about the other program or the service itself In networked systems, a client is usually a computer that accesses shared network resources provided by another computer (i.e., a server).

A "server" is typically a remote computer system which is accessible over a communications medium such as the Internet. The server scans and searches for raw e.g., unprocessed) information sources (e.g., newswire feeds or newsgroups). Based upon such requests by the user, the server presents filtered electronic information to the user as server responses to the client process. The client process may be active in a second computer system, and communicate with one another over a communications medium that allows multiple clients to take advantage of the information-gathering capabilities of the server.

Clients and servers communicate with one another using the functionality provided by a HyperText Transfer Protocol (HTTP). The World Wide Web (WWW) or, simply, the "web," includes all servers adhering to this protocol, which are accessible to clients via a Universal Resource Location (URL). Internet services can be accessed by specifying Universal Resource Locators that have two basic components: a protocol to be used and an object pathname. For example, the Universal Resource Locator address, "http://www.uspto.gov" (i.e., the "home page" for the U.S. Patent and Trademark Office), specifies a hypertext transfer protocol ("http") and a pathname of the server ("www.uspto.gov").

The server name is associated with a unique numeric value (TCP/IP address). Active within the client is a first process, known as a "browser", that establishes the connection with the server, and presents information to the user. The server itself executes corresponding server software that presents information to the client in the form of HTTP responses. The HTTP responses correspond to "web pages" constructed from a Hypertext Markup Language (HTML), or other server-generated data.

A "web page" (also referred to by some designers simply as a "page") is a data file written in a hyper-text language that may have text, graphic images, and even multimedia objects such as sound recordings or move video clips associated with that data file. The web page can be displayed as a viewable object within a computer system. A viewable object can contain one or more components such as spreadsheets, text, hotlinks, pictures, sound, and video objects. A web page can be constructed by loading one or more separate files into an active directory or file structure that is then displayed as a viewable object within a graphical user interface.

When a client workstation sends a request to a server for a web page, the server first transmits (at least partially) the main hypertext file associated with the web page, and then loads, either sequentially or simultaneously, the other files associated with the web page. A given file may be transmitted as several separate pieces via TCP/IP protocol. The constructed web page is then displayed as a viewable object on the workstation monitor. A web page may be "larger" than the physical size of the monitor screen, and devices such as graphical user interface scroll bars can be utilized by the viewing software (i.e., the browser) to view different portions of the web page.

Most text displayed by a web browser is formatted using standard HTML. An HTML file is a text file that contains both the text to be displayed and markup tags that describe how the text should be formatted by the web browser. The HTML markup tags support basic text formatting, such as paragraph breaks, bullet lists, tables, graphs, charts, and so forth. In addition to these basic text formatting tags, HTML provides tags defining graphical user interface components. HTML also can be used to display well known graphical user interface components such as radio buttons, check boxes, scrolling lists of selectable text, and various other such components at the web browser itself.

In an open network, such as the Internet, establishing a secure connection is required in order to prevent a third party from viewing sensitive information, such as personal data or financial transactions. Secure connections can be established between a browser running on a typical client machine, or on a network computer, and a web server using a security protocol such as Secure Sockets Layer (SSL). Unfortunately, this connection is limited to HTML pages loaded by the web browser. In other words, there is no support built into the web browser in order to enable a Java Applet to establish a secure connection through the browser other than the HTTPS protocol. If a Java Applet is to be connected to the web server using a different protocol such as the CORBA IIOP, then a Java security service class library, such as RSA'S JSAFE or IBM'S SSLink must be used.

To establish an encrypted connection from a web browser, executing a Java Applet, to a web server requires an exchange of server certificates between the Java Applet and the server. This presents two problems. First, the browser's certificates are not available to Java for use in establishing a secure connection. Second, the certificate(s) required by the Java security service to establish a secure connection cannot be accessed by a Java Applet, since Applets are not inherently allowed local disk access.

It would therefore be a distinct advantage to have a method and apparatus for using the web browser's installed certificates to set up and establish an encrypted session between a Java Applet and a secure web server for protocols other than HTTPS. It would be further advantageous if the method and apparatus would only require the use of a secure web server and no additional services (i.e., additional servers). The present invention provides such a method and apparatus.

SUMMARY OF THE PRESENT INVENTION

The present invention defines a means for establishing a secure connection between a Java Applet and a secure web server for protocols other than Https via the use of a Java Security Service. More specifically, the present invention uses the web browser's installed certificates to setup and establish an encrypted session between the Java Applet and the secure web server. The secure connection is then used to retrieve the certificates required by the Java security service.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the art that the present invention can be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention, are within the skills of persons of ordinary skill in the relevant art.

Figure 1:
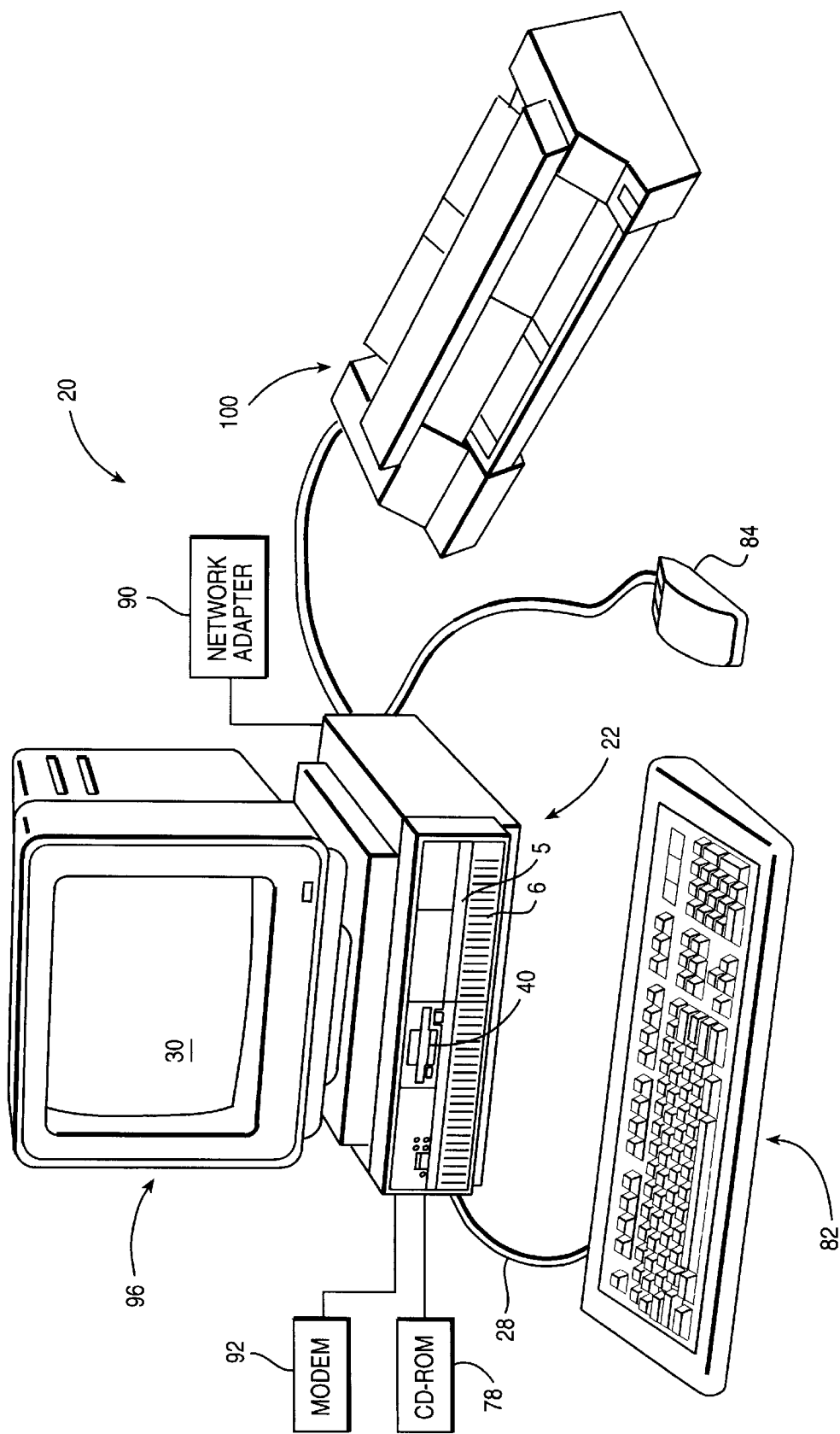
FIG. 1 is a diagram of a data processing system in which the present invention can be practiced.

Reference now being made to FIG. 1, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT) a liquid crystal display (LCD) an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Figure 2:
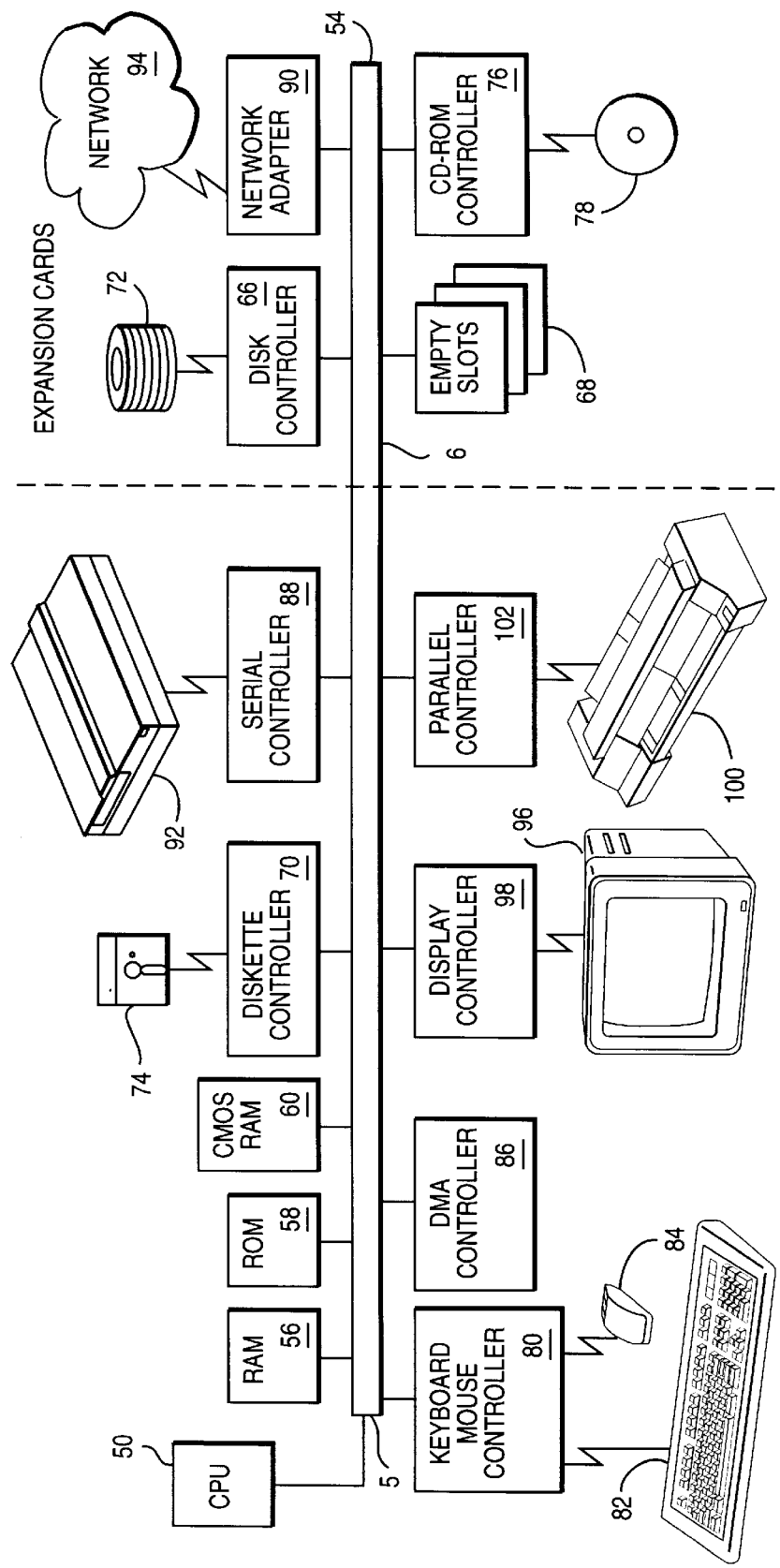
FIG. 2 is a high level block diagram illustrating selected components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and non-volatile memory 60. Such memories include circuitry that allows information to be stored and retrieved. ROMs contain stored data that cannot be modified. Data stored in RAM can be changed by CPU 50 or other hardware devices. Non-volatile memory is memory that does not loose data when power is removed from it. Non-volatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such as positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the trackball, the trackpad, and the pointing device sold under the trademark "TrackPoint" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software, such as server, an electronic bulletin board, the internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other type of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

The present invention defines a means for establishing a secure connection between a Java Applet and a secure web server for protocols other than Https via the use of a Java Security Service. More specifically, the present invention uses the web browser's installed certificates to setup and establish an encrypted session between the Java Applet and the secure web server. The secure connection is then used to retrieve the certificates required by the Java security service.

The present invention eliminates the above noted problems for authenticating the server certificate, and thus, establishing a secure connection from a Java Applet to a web server. The means for accomplishing this task are explained in greater detail in connection with FIG. 3.

Figure 3:
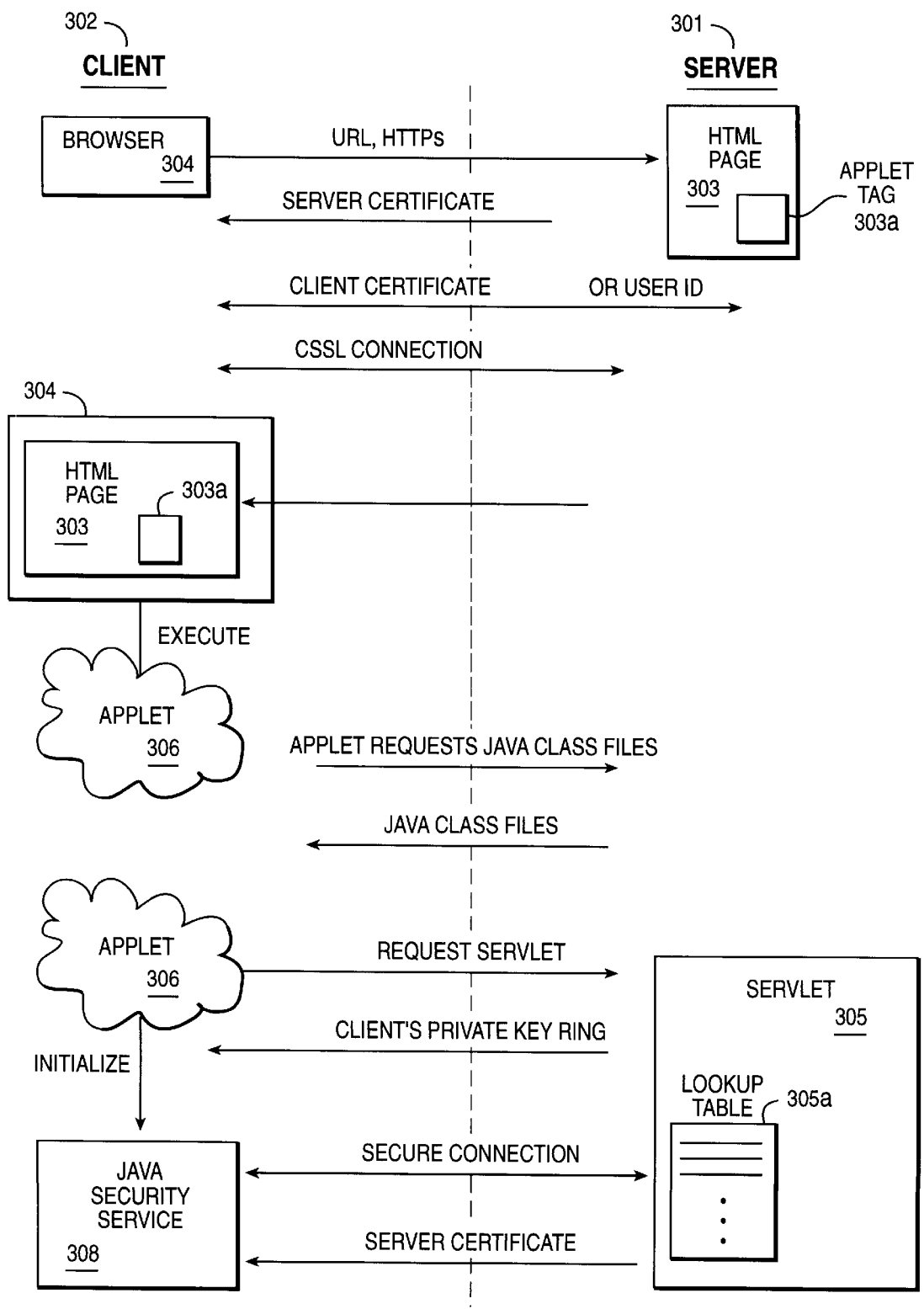
FIG. 3 is a block diagram illustrating the communication protocol for establishing a secure connection between a web server and a client via a Java Applet, executing in a web browser 304, according to the teachings of the preferred embodiment of the present invention.
Figures 4A, 4B:
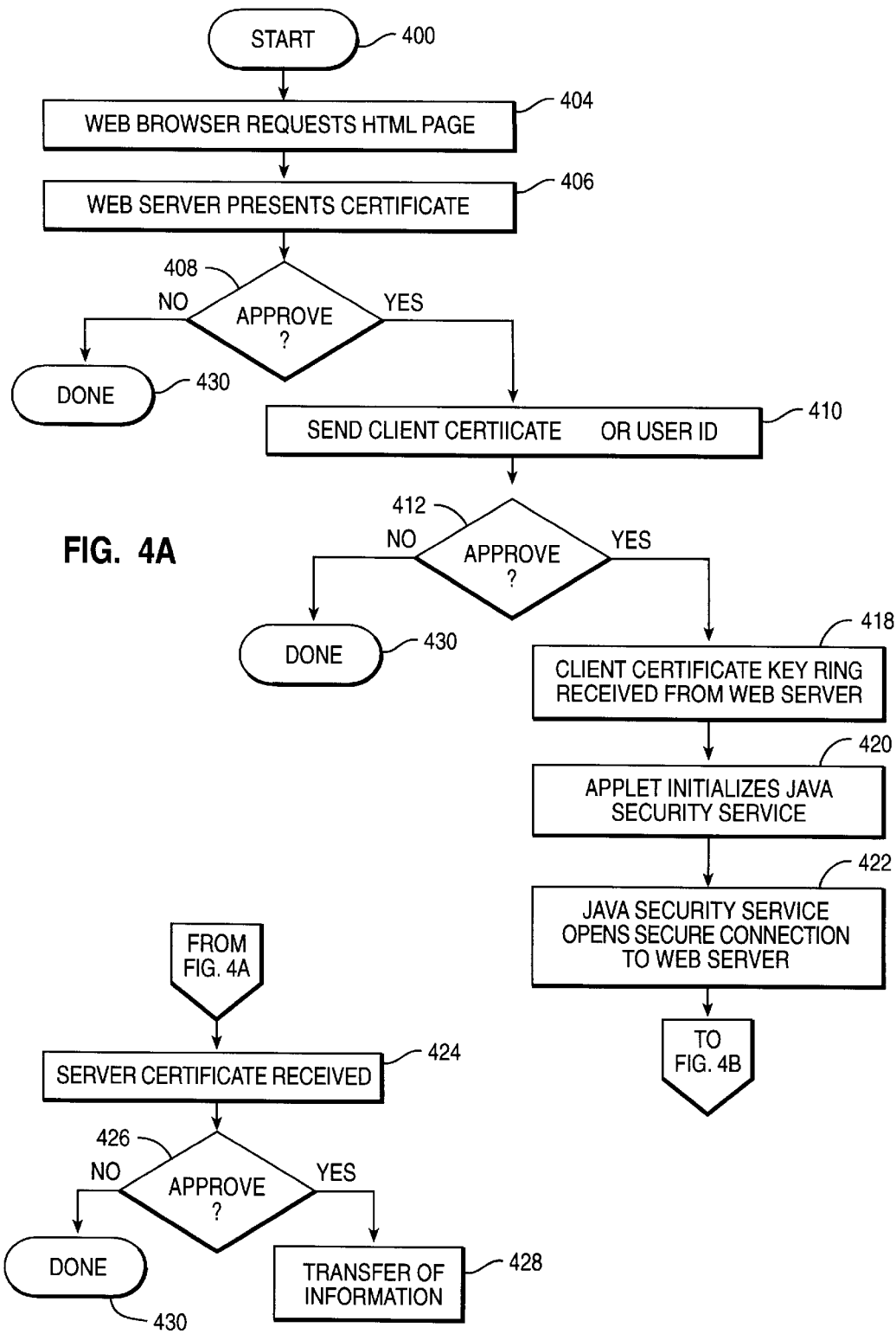
FIGS. 4A–B are a flow chart illustrating the steps for implementing the communication protocol of FIG. 3 according to the teachings of the present invention.

Reference now being made to FIG. 3, a block diagram is shown illustrating the communication protocol for establishing a secure connection between a web server 301 and a client 302 via a Java Applet 306 executing in a web browser 304 according to the teachings of the preferred embodiment of the present invention. FIG. 4 is a flow chart illustrating the steps for implementing the communication protocol of FIG. 3 according to the teachings of the present invention, and is best explained in connection with the description of FIG. 3 as noted by the corresponding steps being indicated in closed parentheses.

As shown in FIG. 3, active within Client 302 is web browser 304. Web browser 304 is not application specific and can be any commercially or publicly available web browser. The protocol of the present invention begins when the web browser 304 requests an HTML page from secure web server 301 (steps 400, and 404). This is typically accomplished by loading an HTML page 303 via a URL address (e.g. https://web_server/index.html) from web server 301 with Secure Sockets Layer (SSL) enabled.

Before the HTML page 303 is loaded into the web browser 304, the web server 301 presents its server certificate to the web browser 304 for approval (steps 406 and 408). After receiving the server certificate, web browser 304 verifies that the server certificate matches its list of approved certificates. Assuming that the server certificate is approved, Client 302 sends its Client certificate to web server 301 for approval (410). The web server 301 verifies that the received client certificate matches its list of approved certificates (412). Further assuming that web server 301 approves the Client certificate, a secured connection is established between Client 302 and Server 301.

After the secured connection has been established, the HTML page 303 is loaded into web browser 304. As noted in FIG. 3, HTML page 303 includes an Applet pack 303a which is executed by web browser 304 and designated by Applet 306. The Applet 306 then requests Java.Class files from web server 301, which are returned shortly thereafter. Applet 306 then requests the client certificate keyring from the web server 301 via Servlet (418). A keyring, as used hereinafter, is a file that contains public keys, private keys, certificates, and trusted root keys. The keyrings for various clients have been stored on the web server 301 for latter retrieval by the Java Applet 306. Each of these keyrings are maintained and identified in a lookup table 305a via their unique distinguishing name as retrieved from the previously passed and approved client certificate via web browser 304.

Once the keyring has been located using the distinguished name of the client 301, the corresponding key ring is passed back to the Applet 306 (step 418). In response to receiving the client keyring, Applet 306 initializes a Java Security Service 308 (step 420). The Java Security Service 308 then opens a secure socket or stream to the web server 301 (step 422). Thereafter, the web server 301 presents the Java Security Service with its server certificate. The Java Security Service 308 uses the received client key ring to approve the server certificate, and a secured connection is established for the transfer of content sensitive information.

The present invention defines a means for establishing a secure connection between a Java Applet and a secure web server for protocols other than Https via the use of a Java Security Service. More specifically, the present invention uses the web browser's installed certificates to setup and establish an encrypted session between the Java Applet and the secure web server. The secure connection is then used to retrieve the certificates required by the Java security service.

What is claimed is:

1. A method of establishing a secure connection between an applet on a client and a server, the method comprising the steps of:

requesting a web page from the server via a web browser, the web page including an applet tag identifying an applet for execution;

executing the applet in response to receiving the web page;

retrieving, via the applet, a client keyring corresponding to the client from the server;

receiving a first server certificate from the server;

approving the first server certificate using the client keyring; and creating, in response to approving the first server certificate, a secure connection between the applet and the server.

2. A method according to claim 1, wherein the step of retrieving, via the applet, a client keyring comprises the step of:

retrieving the client keyring from a table indexed by a plurality of distinguishing names of clients.

3. A method according to claim 1, further comprising the steps of:

receiving, in response to requesting the web page, a second server certificate from the server;

approving, via the web browser, the received second server certificate;

transmitting, in response to approving the received second server certificate, a client certificate to the server;

approving the received client certificate; and creating, in response to approving the client certificate, a HTTPS secure connection between the server and the client.

4. A method according to claim 1, further comprising the steps of:

initializing, in response to retrieving the client keyring, a Java security service; and creating, via the Java security service, a secure socket between the client and the server.

5. A method according to claim 4, wherein the step of receiving a first server certificate from the server comprises the step of:

receiving, via the secure socket, the first server certificate from the server.

6. An apparatus for establishing a secure connection between an applet on a client and a server, the apparatus comprising:

means for requesting a web page from the server via a web browser, the web page including an applet tag identifying an applet for execution;

means for executing the applet in response to receiving the web page;

means for retrieving, via the applet, a client keyring corresponding to the client from the server;

means for receiving a first server certificate from the server;

means for approving the first server certificate using the client keyring; and means for creating, in response to approving the first server certificate, a secure connection between the applet and the server.

7. An apparatus according to claim 6, wherein the means for retrieving, via the applet, a client keyring comprises:

means for retrieving the client keyring from a table indexed by a plurality of distinguishing names of clients.

8. An apparatus according to claim 6, further comprising:

means for receiving, in response to requesting the web page, a second server certificate from the server;

means for approving, via the web browser, the received second server certificate;

means for transmitting, in response to approving the received second server certificate, a client certificate to the server;

means for approving the received client certificate; and means for creating, in response to approving the client certificate, a HTTPS secure connection between the server and the client.

9. An apparatus according to claim 6, further comprising:

means for initializing, in response to receiving the client keyring, a Java security service; and means for creating, via the Java security service, a secure socket between the client and the server.

10. An apparatus according to claim 9, wherein the means for receiving a first server certificate from the server comprises:

means for receiving, via the secure socket, the first server certificate from the server.

11. A computer program product on a computer usable medium, the computer usable medium having computer usable program means embodied therein for establishing a secure connection between an applet on a client and a server, the computer usable program means including:

means for requesting a web page from the server via a web browser, the web page including an applet tag identifying an applet for execution;

means for executing the applet in response to receiving the web page;

means for retrieving, via the applet, a client keyring corresponding to the client from the server;

means for receiving a first server certificate from the server;

means for approving the first server certificate using the client keyring; and means for creating, in response to approving the first server certificate, a secure connection between the applet and server.

12. A computer program product according to claim 11, wherein the means for retrieving, via the applet, a client keyring comprises:

means for receiving the client keyring from a table indexed by a plurality of distinguishing names of clients.

13. A computer program product according to claim 11, wherein the computer usable program means further comprises:

means for receiving, in response to requesting the web page, a second server certificate from the server;

means for approving, via the web browser, the received second server certificate;

means for transmitting, in response to approving the received second server certificate, a client certificate to the server;

means for approving the received client certificate; and means for creating, in response to approving the client certificate, a HTTPS secure connection between the server and the client.

14. A computer program product according to claim 11, further comprising:

means for initializing, in response to retrieving the client keyring, a Java security service; and means for creating, via the Java security service, a secure socket between the client and the server.

15. A computer program product according to claim 14 wherein the means for receiving a first server certificate from the server further comprises:

means for receiving, via the secure socket, the first server certificate from the server.

* * * * *